United States Patent
Shinomiya (10) Patent No.: US 8,521,847 B2
(45) Date of Patent: *Aug. 27, 2013

(54) NETWORK SYSTEM FOR REDUCING PROBABILITY OF COLLISIONS BETWEEN RESPONSE SIGNALS

(75) Inventor: Hirotatsu Shinomiya, Sakai (JP)

(73) Assignee: Panasonic Corporation, Osaka (JP)

(*) Notice: Subject to any disclaimer, the term of this patent is extended or adjusted under 35 U.S.C. 154(b) by 162 days.

This patent is subject to a terminal disclaimer.

(21) Appl. No.: 13/147,309

(22) PCT Filed: Feb. 2, 2010

(86) PCT No.: PCT/JP2010/051422
§ 371 (c)(1),
(2), (4) Date: Oct. 17, 2011

(87) PCT Pub. No.: WO2010/087496
PCT Pub. Date: Aug. 5, 2010

(65) Prior Publication Data
US 2012/0033657 A1   Feb. 9, 2012

(30) Foreign Application Priority Data

Feb. 2, 2009   (JP) .................. 2009-021987

(51) Int. Cl.
*H04L 12/28* (2006.01)
*H04W 4/00* (2009.01)
*G06F 15/16* (2006.01)

(52) U.S. Cl.
USPC ........... 709/219; 370/252; 370/338; 709/217; 709/218

(58) Field of Classification Search
USPC .................. 370/252, 238; 709/217–219
See application file for complete search history.

(56) References Cited

U.S. PATENT DOCUMENTS

| 7,444,421 B2 * | 10/2008 | Katayama | 709/232 |
| 2002/0110085 A1 * | 8/2002 | Ho et al. | 370/230 |

(Continued)

FOREIGN PATENT DOCUMENTS

| EP | 1 511 342 A1 | 3/2005 |
| JP | 10-200538 A | 7/1998 |

(Continued)

OTHER PUBLICATIONS

International Search Report for International Application No. PCT/JP2010/051422 issued Mar. 9, 2010.

*Primary Examiner* — Joseph Avellino
*Assistant Examiner* — Aftab Nasir Khan
(74) *Attorney, Agent, or Firm* — Renner, Otto, Boisselle & Sklar, LLP (57) ABSTRACT

The network system includes a controller and a plurality of terminals. The controller sends a first request signal indicative of a response probability to the plurality of the terminals. Upon receiving the first request signal, each terminal sends a first response signal to the controller at the response probability indicated by the first request signal. The controller determines the total number of the terminals on the basis of the number of the received first response signals and the response probability. The controller determines a limited time period on the basis of the total number of the terminals, and sends a second request signal indicative of the limited time period to the terminals. Upon receiving the second request terminal, each terminal randomly selects a waiting time period from time periods not greater than the limited time period, and sends a second response signal to the controller after a lapse of the waiting time period.

10 Claims, 6 Drawing Sheets

(56) References Cited

U.S. PATENT DOCUMENTS

| | | | |
|---|---|---|---|
| 2004/0093421 A1* | 5/2004 | Peng et al. | 709/232 |
| 2005/0122902 A1* | 6/2005 | Guo et al. | 370/229 |
| 2006/0252439 A1* | 11/2006 | Cai | 455/515 |
| 2007/0133448 A1* | 6/2007 | Gao et al. | 370/311 |
| 2008/0002591 A1* | 1/2008 | Ueno | 370/244 |
| 2008/0240215 A1 | 10/2008 | Nobukiyo et al. | |
| 2010/0232324 A1* | 9/2010 | Radunovic et al. | 370/277 |
| 2011/0010592 A1* | 1/2011 | Takayanagi et al. | 714/704 |
| 2013/0064236 A1* | 3/2013 | Ji et al. | 370/338 |

FOREIGN PATENT DOCUMENTS

| | | |
|---|---|---|
| JP | 2000-295167 A | 10/2000 |
| JP | 2006-060408 A | 3/2006 |
| JP | 2008-244911 A | 10/2008 |
| WO | 03/105519 A1 | 12/2003 |

\* cited by examiner

FIG. 9

NETWORK SYSTEM FOR REDUCING PROBABILITY OF COLLISIONS BETWEEN RESPONSE SIGNALS

TECHNICAL FIELD

The present invention is directed to network systems, and particularly to a network system comprising a controller and a plurality of terminals, each terminal sending a response signal to the controller in response to receiving a request signal from the controller.

BACKGROUND ART

Document 1 (JP 2006-60408 A) discloses a network system including a wireless transmitter and wireless receivers. The wireless transmitter transmits a block ACK request signal to each wireless receiver. The block ACK request signal includes a parameter indicating a range of random numbers used for determining a contention window. Each wireless receiver randomly selects a value of the contention window with reference to the parameters included in the block ACK request signal. Each wireless receiver sends a block ACK (response signal) after a lapse of a waiting time period starting from the time of receiving the block ACK request signal. The waiting time period is determined by use of a DIFS (Distributed Inter Frame Space) and the value of the contention window.

In the network system disclosed in Document 1, each wireless receiver randomly determines the value of the contention window. Consequently, it is possible to reduce the probability of collision between the response signals.

In the network system disclosed in Document 1, the maximum value of the contention window is determined irrespective of the number of the wireless receivers. When the number of the wireless receivers is excessive relative to the maximum value of the contention window, the probability of collision between the response signals can not be reduced sufficiently. Therefore, the wireless transmitter may not receive the response signal. In contrast, when the maximum value of the contention window is excessive relative to the number of the wireless receivers, the waiting time period is likely to be prolonged and communication efficiency may become poor.

DISCLOSURE OF INVENTION

In view of the above insufficiency, the present invention has been aimed to propose a network system capable of reducing the probability of collision between response signals yet improving communication efficiency.

The network system in accordance with the present invention comprises: a controller; and a plurality of terminals connected to the controller via a network. The controller comprises a first communication unit configured to communicate with the terminal via the network, a first request unit, a counting unit, a terminal number determination unit, a limited time determination unit, and a second request unit. Each of the terminals comprises a second communication unit configured to communicate with the controller via the network, a first response unit, a waiting time determination unit, and a second response unit. The first request unit is configured to send a first request signal to the plurality of the terminals via the first communication unit, the first request signal including probability information indicative of a predetermined probability. The first response unit is configured to, upon receiving the first request signal via the second communication unit, send a first response signal to the controller via the second communication unit at the probability indicated by the probability information included in the first request signal. The counting unit is configured to count the first response signals received via the first communication unit, and output the obtained number of the first response signals. The terminal number determination unit is configured to determine a total number of the terminals responding to the controller on the basis of the probability and the number of the first response signals obtained from the counting unit. The limited time determination unit is configured to determine a limited time period on the basis of the total number of the terminals determined by the terminal number determination unit. The second request unit is configured to send a second request signal to the plurality of the terminals via the first communication unit, the second request signal including limited time information indicative of the limited time period determined by the limited time determination unit. The waiting time determination unit is configured to, upon receiving the second request signal via the second communication unit, select a waiting time period in a random manner from time periods not greater than the limited time period indicated by the limited time information included in the second request signal. The second response unit is configured to send a second response signal to the controller via the second communication unit after a lapse of the waiting time period.

In a preferred aspect, the controller further comprises a storing means configured to store information derived from the number of the first response signals. The controller is configured to use the information stored in the storing means to create the second request signal and send the created second request signal.

In a more preferred aspect, the storing means is defined as a terminal number storage unit configured to store the total number of the terminals determined by the terminal number determination unit as the information derived from the number of the first response signals. The limited time determination unit is configured to determine the limited time period by use of the total number of the terminals stored in the terminal number storage unit.

In a further preferred aspect, the controller further comprises a terminal number update unit. The first request unit is configured to send the first request signal to the plurality of the terminals periodically via the first communication unit. The terminal number update unit is configured to, upon acknowledging that the terminal number determination unit determines the total number of the terminals, update the total number of the terminals stored in the terminal number storage unit with the total number of the terminals determined by the terminal number determination unit.

Alternatively, in a more preferred aspect, the storing means is defined as a limited time storage unit configured to store the limited time period determined by the limited time determination unit as the information derived from the number of the first response signals. The second request unit is configured to create the second request signal which includes the limited time information indicative of the limited time period stored in the limited time storage unit.

In a further preferred aspect, the controller further comprises a limited time update unit. The first request unit is configured to send the first request signal to the plurality of the terminals periodically via the first communication unit. The limited time update unit is configured to, upon acknowledging that the limited time determination unit determines the limited time period, update the limited time period stored in the limited time storage unit with the limited time period determined by the limited time determination unit.

In a preferred aspect, the probability indicated by the probability information is determined on the basis of a maximum number of the first response signals which the first communication unit can receive simultaneously, so as to allow said first communication unit to receive the first response signals respectively from all of said terminals within a predetermined time period starting from the time of sending the first request signal.

In a preferred aspect, the terminal number determination unit is configured to determine the total number of the terminals on the basis of a quotient of the number of the first response signals obtained from the counting unit and the probability of the probability information included in the first request signal.

In a preferred aspect, the limited time period is defined to be a predetermined range within which the first communication unit receives a predetermined number of the second response signals. The predetermined number is defined to be the total number of the terminals determined by the terminal number determination unit. The limited time determination unit is configured to calculate a quotient of the total number of the terminals determined by the terminal number determination unit and the number of the first response signals which the first communication unit can receive per unit time period and determine the limited time period on the basis of the resultant quotient.

Alternatively, in a preferred aspect, the limited time period is defined to be a predetermined range within which the first communication unit receives a predetermined number of the second response signals. The predetermined number is defined to be the number of the terminals which have not sent the first response signal. The limited time determination unit is configured to divide a difference by the number of the first response signals which the first communication unit can receive per unit time period to determine the limited time period. The difference is defined as a difference between the total number of the terminals determined by the terminal number determination unit and the number of the first response signals counted by the counting unit. Each of the terminals is configured to send no second response signal once after sending the first response signal to the controller.

BEST MODE FOR CARRYING OUT THE INVENTION

First Embodiment

Figure 1:
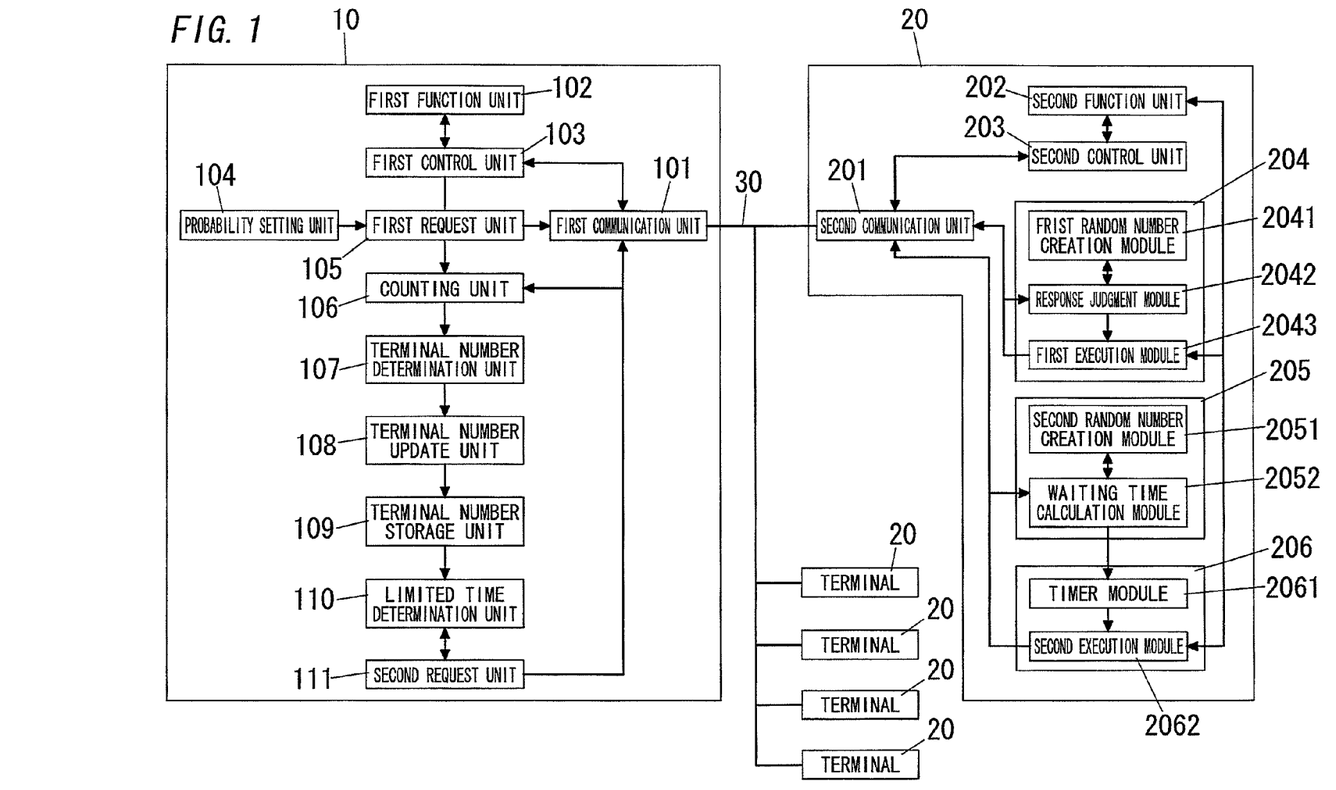
FIG. 1 is a diagram illustrating a configuration of the network system of the first embodiment.

FIG. 1 shows a configuration of the network system of the present embodiment. The network system of the present embodiment includes a controller (multicast terminal device) 10 and a plurality of terminals 20 connected to the controller 10 via a network 30. In the present network system, plural terminal devices (the controller 10 and terminals 20) are connected to the network 30, and communicate with each other. For example, each of the controller 10 and terminals 20 comprises a microcomputer including such as a memory, a processor, and an interface adapted in use to be connected to the network 30. Besides, the network 30 may be a wired network or a wireless network.

The controller 10 is configured to monitor and control each of the terminals 20. In more detail, the controller 10 sends a request signal (response requesting command) to each of the terminals 20. The request signal is a multicast packet such as a request signal for controlling the terminal 20, a request signal for obtaining a status of the terminal 20, and a request signal for changing setting values of the terminal 20. Upon receiving the request signal, the terminal 20 performs processing corresponding to a content of the received request signal. Further, the terminal 20 sends a response signal to the controller 10. The response signal is such as a control completion response signal indicating completion of control, a status announcing response signal including status data, and a setting completion response signal indicating completion of change of settings. The controller 10 receives the response signals from each terminal 20.

The controller 10 includes a first communication unit 101, a first function unit 102, and a first control unit 103. Further, the controller 10 includes a probability setting unit 104, a first request unit 105 for sending a request signal 40 (first request signal 41), a counting unit 106, a terminal number determination unit 107, a terminal number update unit 108, a terminal number storage unit 109, a limited time determination unit 110, and a second request unit 111 for sending a request signal 40 (second request signal 42).

The first communication unit 101 is a network interface for communicating with the terminals 20 via the network 30. The first communication unit 101 is configured to store address information peculiar to the controller 10. The first communication unit 101 establishes network communication by use of the stored address information. For example, the address information is an IP address and a physical address (MAC address).

The first function unit 102 is configured to execute processing (operation) for a service (function of the controller 10) to be provided by the controller 10. In the present embodiment, the first function unit 102 communicates with the terminals 20 via the network 30, thereby monitoring and controlling the terminals 20.

The terminal 20 may be lighting apparatus or air conditioning apparatus. The lighting apparatus is configured to turn on and off lighting equipment and to dim the lighting equipment. The air conditioning apparatus is configured to drive air conditioning equipment.

Each of the terminals 20 includes a second communication unit 201, a second function unit 202, and a second control unit 203. Each of the terminals 20 further includes a first response unit 204 for sending a response signal 50 (first response signal 51), a waiting time determination unit 205, and a second response unit 206 for sending a response signal 50 (second response signal 52).

The second communication unit 201 is a network interface for communicating with the controller 10 via the network 30. The second communication unit 201 is configured to store address information peculiar to the terminal 20. The second communication unit 201 establishes the network communication by use of the stored address information. For example, the address information is an IP address and a physical address (MAC address).

The second function unit 202 is configured to execute processing (operation) for a service (function of the terminal 20) to be provided by the terminal 20. The second function unit 202 is a target to be controlled or monitored by the controller 10. When the terminal 20 is lighting apparatus, the second function unit 202 is a lighting means for turning on and off and diming a lighting load (lighting equipment). When the terminal 20 is air conditioning apparatus, the second function unit 202 is an air conditioner controlling means for controlling air conditioning equipment to regulate a room temperature.

For the purpose of giving an object server function to the first and second control units 103 and 203, each of the first and second control units 103 and 203 is provided with a software module including objects which are used to perform processing for providing a service.

Each object has one or more interfaces (input output definition). The interface defines control information or monitoring information (e.g., a variable, function, event information, and a combination thereof) corresponding to the service to be provided by the function unit 102 or 202 (the service to be provided by the controller 10 or the terminal 20).

The object has an object unique identifier (referred to as "OID", if necessary) uniquely. The interface has an interface identifier (referred to as "IID", if necessary) uniquely. There is a specific identifier which is allocated to a combination of the object and the interface. In the following, a content of the specific identifier is expressed as [OID+IID].

The first control unit 103 functions as an object controlling means and a response signal sending means. The second control unit 203 functions as a request signal sending means configured to create the request signal using the specific identifier and send the created request signal.

The object controlling means is configured to, upon receiving the request signal using the specific identifier, operate the object in response to the contents of the request signal to provide the control information to the function unit 102. In addition, the object controlling means is configured to perform processing of obtaining the monitoring information from the function unit 102. The object controlling means is configured to perform processing of obtaining information regarding the object. The object controlling means is configured to perform processing of providing a function for indicating operation to the function unit 102. The object controlling means is configured to perform processing of obtaining the variable indicating the current status of the function unit 102. The object controlling means is configured to perform processing of obtaining the event information indicating change in the status of the function unit 102.

The response signal sending means is configured to send the response signal to the terminal device which is the sender of the request signal. The response signal includes a result of the processing executed by the object controlling means.

Figure 2:
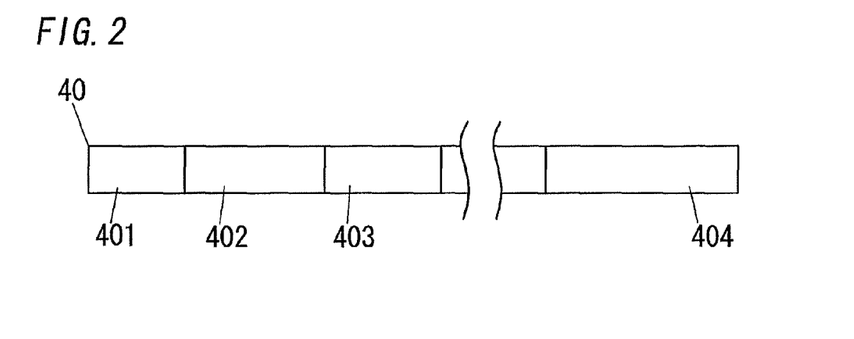
FIG. 2 is a diagram illustrating a configuration of a request signal.

FIG. 2 shows a configuration of the request signal 40. The request signal 40 includes an operation code 401, the interface identifier 402, and the object unique identifier 403. The operation code 401 denotes the type of the response requesting command. The interface identifier 402 denotes the service (function) provided by the terminal device. The object unique identifier 403 denotes the control target or the monitoring target. Further, the request signal 40 may include a parameter 404 depending on the type of the operation code 401. When the terminal 20 has the object having the specific identifier which is defined by the interface identifier 402 and the object unique identifier 403 included in the request signal 40, the terminal 20 receives the request signal 40 via the second communication unit 201.

For example, the operation code 401 includes "Watch", "Get", "Set", and "Invoke". The operation code "Watch" is used to request a search for determining whether or not the object having the OID and IID designated by the request signal 40 is present in the network 30. The operation code "Get" is used to request to obtain a value of the object having the OID and IID designated by the request signal 40. The operation code "Set" is used to request to set a value to the object having the OID and IID designated by the request signal 40. The operation code "Invoke" is used to request to execute the object having the OID and IID designated by the request signal 40 to provide the control information to the function unit 202.

A wildcard "*" is available in the request signal 40. The wildcard denotes any of OIDs or IIDs. For example, when the controller 10 sends the request signal having the object unique identifier 403 of "*", the interface identifier 402 of "*", and the operation code 401 of "Watch", all of the terminals 20 receives the request signal, and sends the response signal including the combination of the object and the interface to the controller 10.

For example, the controller 10 sends the request signal in which only the interface identifier 402 is the wildcard "*" and the operation code 401 denotes the "Watch". Upon receiving the request signal, the terminal 20 sends, to the controller 10, the response signal including the combination of the OID designated by the request signal and the interface of the OID designated by the request signal.

For example, the controller 10 sends the request signal in which only the object unique identifier 403 is the wildcard "*" and the operation code 401 denotes the "Watch". Upon receiving the request signal, the terminal 20 sends, to the controller 10, the response signal including the combination of the IID designated by the request signal and the OID including the IID designated by the request signal.

In the present embodiment, using the wildcard "*" as the object unique identifier 403 of the request signal 40 enables multicast communication.

Figure 3:
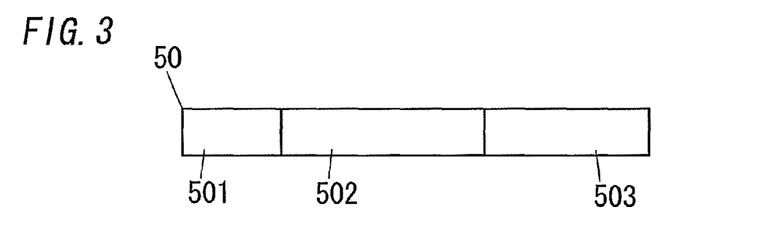
FIG. 3 is a diagram illustrating a configuration of a response signal.

FIG. 3 illustrates the response signal 50. The response signal 50 includes an operation code 501 and terminal identification information 502. The operation code 501 denotes the type of the response signal 50. The terminal identification information 502 denotes the identification information (in the present embodiment, the address of the terminal 20) of the terminal 20 being the sender of the response signal. Further, the response signal 50 may include a specific parameter 503 depending on the type of the operation code 501.

For example, upon receiving the request signal 40 having the operation code 401 of "Watch", the terminal 20 sends the response signal 50 having the operation code 501 of "Provide". In this instance, the response signal 50 includes the parameter 503 which denotes the combination of the object unique identifier and the interface identifier which are designated by the request signal 40.

Besides, the plural objects may have the interface (i.e., the interface having the same IID) which has the same definition corresponding to the service provided by the terminal device.

An OSI 7-layer model is used as the protocol for the network system of the present embodiment. As an application layer of the uppermost layer, a unique object access protocol (OAP) is used to give and receive the information such as the variable, the function and the event information between software modules of the controller 10 and the terminal 20.

When the first control unit 103 sends the request signal 40 to the terminals 20, at first the first control unit 103 provides a request of sending the first request signal 41 to the first request unit 105, and subsequently provides a request of sending the second request signal 42 to the second request unit 111. The first and second request signals include the same interface identifier 402 and object identifier 403.

The first request unit 105 is configured to, in response to receiving the request of sending the first request signal 41, send the first request signal 41 to the plurality of the terminals 20 via the first communication unit 101. The first request unit 105 is configured to send the first request signal 41 to the plurality of the terminals 20 via the first communication unit 101 periodically.

Figure 4:
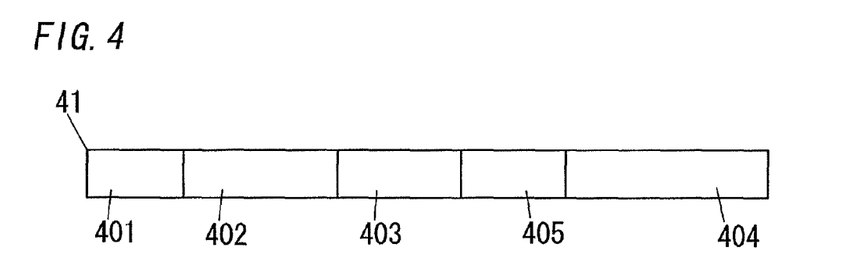
FIG. 4 is a diagram illustrating a configuration of a first request signal of the network system in accordance with the first embodiment.

The first request signal 41 includes, as shown in FIG. 4, the operation code 401, the interface identifier 402, the object unique identifier 403, and probability information 405. The first request signal 41 may include the specific parameter 404 depending on the type of the operation code 401. The probability information indicates a predetermined probability (response probability).

The probability setting unit 104 is an input device for inputting the response probability. The response probability defines a probability that the terminal 20 sends the first response signal 51 in response to receiving the first request signal 41. In other words, the response probability defines a probability that upon receiving the first request signal 41 the terminal 20 performs operation corresponding to the operation code 401 of the first request signal 41 and sends the first response signal 51 to the controller 10. The response probability is in the range of 0 to 100 [%]. When the response probability is 100 [%], the terminal 20 is sure to send the first response signal 51. When the response probability is 50 [%], the terminal 20 sends the first response signal 51 at the probability of 50 [%].

The response probability is determined on the basis of a maximum number (maximum simultaneous reception number) of the first response signals 51 which the first communication unit 101 can receive simultaneously, so as to allow the first communication unit 101 to receive the first response signals 51 respectively from all of the terminals 20 within a predetermined time period starting from the time of sending the first request signal 41. The maximum simultaneous reception number varies in accordance with access control performed in a communication transport (transport) of the network 30. For example, in CSMA/CA communication, the maximum simultaneous reception number varies in accordance with accuracy of carrier sense, a backoff method for the carrier sense, a length of backoff time, or the retransmission number.

The response probability is set to a sufficiently-small value (e.g., 10%) in consideration of the communication transport of the network 30, in order to allow the controller 10 to receive all of the first response signals 51 respectively sent from the terminals without causing no packet loss in transmitting the first response signals 51.

The first response unit 204 is configured to, upon receiving the first request signal 41 via the second communication unit 201, send the first response signal 51 to the controller 10 via the second communication unit 201 at the response probability indicated by the probability information included in the first request signal 41. The first response unit 204 functions as the object controlling means and the response signal sending means. The first response signal 51 has the substantially same configuration as that of the response signal 50.

The first response unit 204 includes a first random number creation module 2041, a response judgment module 2042, and a first execution module 2043.

The first random number creation module 2041 is configured to create a random number within the range of 0 to 100. The first random number creation module 2041 provides the resultant random number to the response judgment module 2042.

The response judgment number 2042 is configured to, upon receiving the first request signal 41 via the second communication unit 201, request the first random number creation module 2041 to create the random number. The response judgment module 2042 is configured to, upon obtaining the random number from the first random number creation module 2041, compare the random number obtained from the first random number creation module 2041 with the response probability indicated by the probability information 405 included in the first request signal 41. The response judgment module 2042 determines to send the first response signal 51 when the random number is less than the response probability. The response judgment module 2042 determines not to send the first response signal 51 when the random number is not less than the response probability.

When the response judgment module 2042 determines to send the first response signal 51, the first execution module 2043 operates the object designated by the operation command 401 of the first request signal 41, and sends the first response signal 51. When the response judgment module 2042 determines not to send the first response signal 51, the first execution module 2043 does not operate the object designated by the operation command 401 of the first request signal 41 and send the first response signal 51, too.

The counting unit 106 is configured to count the first response signals 51 which the first communication unit 101 has received. The counting unit 106 counts the first response signals 51 received by the first communication unit 101 until a predetermined time period elapses from the time at which the first communication unit 101 sends the first request signal 41. After a lapse of the predetermined time period, the counting unit 106 provides the number of the first response signals 51 to the terminal number determination unit 107.

The terminal number determination unit 107 is configured to determine a maximum number (total number) of the terminals 20 responding to the controller 10 on the basis of the response probability indicated by the probability information included in the first request signal 41 and the number of the first response signals 51 obtained from the counting unit 106. In other words, the terminal number determination unit 107 determines the maximum number of the terminals 20 which send the first response signal 51 to the controller 10 in response to receiving the first request signal 41. The terminal number determination unit 107 is configured to determine the total number of the terminals 20 on the basis of a quotient of the number of the first response signals 51 obtained from the counting unit 106 and the response probability of the probability information included in the first request signal 41. In the present embodiment, the unit of the response probability is [%]. The terminal number determination unit 107 calculates the total number of the terminals 20 by multiplying 100 by the quotient obtained by dividing the number of the first response signals 51 obtained from the counting unit 106 by the response probability of the probability information included in the first request signal 41. For example, when the response probability is 10 [%] and the number of the first response signals 51 is 10, the total number of the terminals 20 is 100.

The terminal number storage unit 109 is used for storing the total number of the terminals 20 determined by the terminal number determination unit 107.

Upon determination of the total number of the terminals 20 at the terminal number determination unit 107, the terminal number update unit 108 responds to store the total number of the terminals 20 in the terminal number storage unit 109. Further, the terminal number update unit 108 is configured to, when the terminal number determination unit 107 newly determines the total number of the terminals 20, update the total number of the terminals 20 in the terminal number storage unit 109 in match with the newly determined total number of the terminals 20.

The limited time determination unit 110 is configured to determine a limited time period on the basis of the total number of the terminals determined by the terminal number determination unit 107. The limited time determination unit 110 is configured to determine the limited time period by use of the total number of the terminals 20 thus stored in the terminal number storage unit 109 once after the terminal number storage unit 109 has stored the total number of the terminals 20.

The limited time period is defined to be a predetermined range within which the first communication unit 101 receives a predetermined number of the second response signals 52. Especially, the limited time period is preferred to be a minimum time period within which the first communication unit 101 receives a predetermined number of the second response signals 52. In the present embodiment, the limited time period is determined as a maximum time period within which all the terminals 20 in the number estimated by the terminal number determination unit 107 can send the second response signal 52 to the controller 10. In other words, the limited time period is defined as a time period within which the controller 10 receives the second response signals 52 respectively sent from all of the terminals 20 in the number equivalent to the total number of the terminals 20 estimated by the terminal number determination unit 107. The limited time period is determined on the basis of the transport used by the network 30. The communication speed of the transport is important for determining the limited time period. As described below, the terminal 20 determines a waiting time period in a random manner. The waiting time period varies from 0 to the limited time period theoretically. However, practically, the waiting time period does not always vary theoretically. Therefore, the limited time period need have an enough range such that the plural terminals 20 have the different waiting time periods. In addition, the limited time period is predetermined not to be less than a time period within which the target terminal 20 completes the communication at the speed identical to the communication speed of the transport.

In the present embodiment, the above predetermined number is the total number of the terminals 20 determined by the terminal number determination unit 107. Thus, in the present embodiment, the limited time determination unit 110 divides the total number of the terminals 20 determined by the terminal number determination unit 107 by the maximum number of the first response signals 51 which the first communication unit 101 can receive per unit time, thereby determining the limited time period. For example, when the maximum number of the first response signals 51 which the first communication unit 101 can receive per unit time (e.g., 1 second) is 10 (the communication transport used in the network 30 can process ten terminals per one second), the limited time period is a quotient (=10 [sec]) obtained by dividing the total number (=100) of the terminals 20 determined by the terminal number determination unit 107 by the maximum number (=10) of the first response signals 51 which the first communication unit 101 can receive per unit time.

The limited time determination unit 110 may store a data table indicative of a correspondence relation between the total number of the terminals 20 and the limited time period. In this instance, the limited time determination unit 110 may read out from the above data table the limited time period corresponding to the total number of the terminals 20 obtained from the terminal number determination unit 107.

The second request unit 111 is configured to control the first communication unit 101 so as to send the second request signal 42 (see FIG. 5) to the plurality of the terminal 20 via the first communication unit 101. In response to receiving the request of sending the second request signal 42, the second request unit 111 requests the limited time determination unit 110 to determine the limited time period. The limited time determination unit 110 determines the limited time period on the basis of the total number of the terminals 20 stored in the terminal number storage unit 109 and provides the resultant limited time period to the second request unit 111 in response to the request from the second request unit 111.

Figure 5:
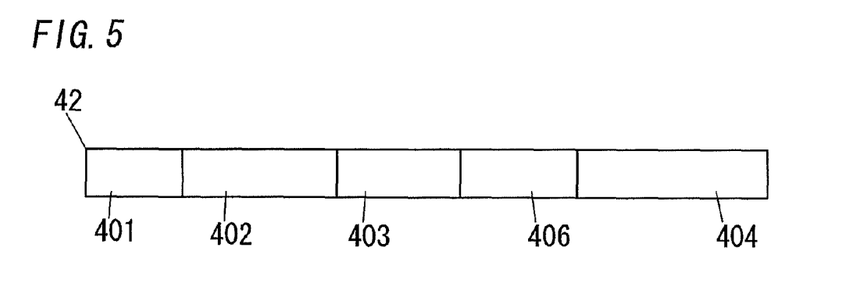
FIG. 5 is a diagram illustrating a configuration of a second request signal of the network system in accordance with the first embodiment.

The second request signal 42 includes, as shown in FIG. 5, the operation code 401, the interface identifier 402, the object unique identifier 403, and limited time information 406. The limited time information 406 indicates the limited time period determined by the limited time determination unit 110. The second request signal 42 may include the specific parameter 404 depending on the type of the operation code 401. The second request signal 42 and the first request signal 41 have the same operation code 401, interface identifier 402, and object unique identifier 403. In other words, the second request unit 113 sends the second request signal 42 to the terminal 20 which sends the first response signal 51 to the controller 10 in response to the first request signal 41.

The waiting time determination unit 205 is configured to, in response to receiving the second request signal 42 via the second communication unit 201, select randomly the waiting time period from time periods less than the limited time period indicated by the limited time information included in the second request signal 42. The waiting time determination unit 205 includes a second random number creation module 2051 and a waiting time calculation module 2052.

The second random number creation module 2051 is configured to create a random number within the range of 0 to 100. The second random number creation module 2051 provides the resultant random number to the waiting time calculation module 2052. Besides, the first random number creation module 2041 may be use as the second random number creation module 2051. In this instance, the second random number creation module 2051 can be omitted.

The waiting time calculation module 2052 is configured to request the second random number creation module 2051 to create the random number upon receiving the second request signal 42 via the second communication unit 201. The waiting time calculation module 2052 is configured to calculate the waiting time period upon obtaining the random number from the second random number creation module 2051. The waiting time period is determined on the basis of a quotient obtained by dividing a product by 100, the product being obtained by multiplying the limited time period of the limited time information included in the second request signal 42 by the random number (obtained from the second random number creation module 2051). Consequently, the waiting time determination unit 205 determines the waiting time period randomly within the range of 0 to the limited time period [sec].

The second response unit 206 is configured to control the second communication unit 201 so as to send the second response signal 52 to the controller 10 via the second communication unit 201 after a lapse of the waiting time period. The second request unit 206 functions as the object controlling means and the response signal sending means. The second response unit 206 includes a timer module 2061 and a second execution module 2062. Upon obtaining the waiting time period from the waiting time calculation module 2052, the timer module 2061 starts timing processing of measuring the waiting time period. When the waiting time period elapses, the timer module 2061 notifies the second execution module 2062 of the lapse of the waiting time period. Upon being notified of the lapse of the waiting time period, the second execution module 2062 operates the object designated by the operation command 401 of the second request signal 42, and sends the second response signal 52. The second response signal 52 has the substantially same configuration as that of the response signal 50.

Figure 6:
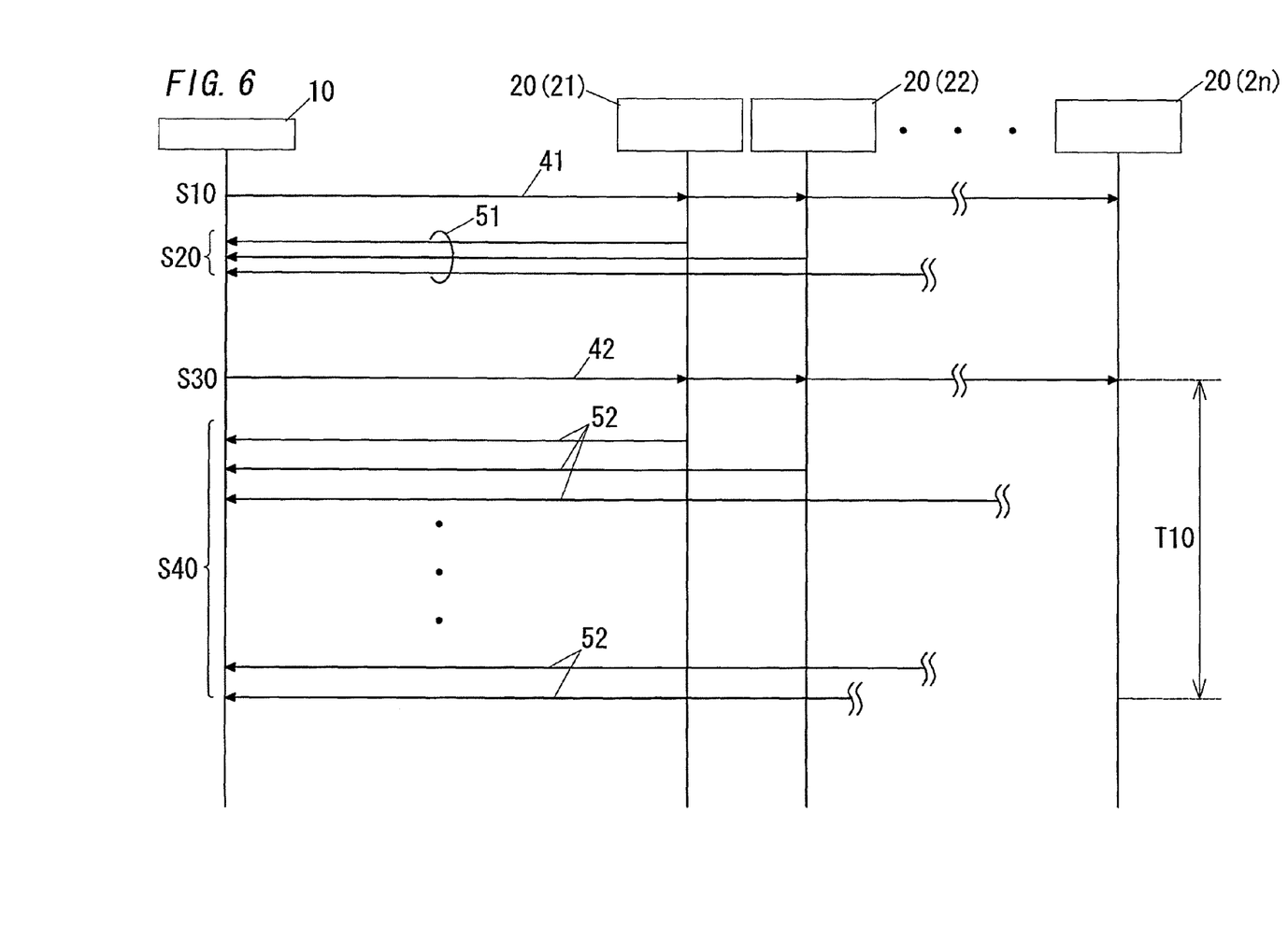
FIG. 6 is a sequence diagram illustrating operation of the network system of the first embodiment.

Next, an explanation using FIG. 6 is made to operation of the network system of the present embodiment. In the following explanation, in order to distinguish between the plural terminals 20, the terminals 20 are respectively designated by use of reference numerals 21, 22, . . . , 2n, if necessary.

The terminal 21 includes the object having the object unique identifier "OID1". The object having "OID1" includes interfaces respectively having the interface identifiers "IID6" and "IID7".

The terminal 22 includes the object having the object unique identifier "OID2". The object having "OID2" includes interfaces respectively having the interface identifiers "IID3" and "IID7".

The other terminals 20 include the object containing the interface having the interface identifier "IID7".

As to the controller 10, the first request unit 105 sends periodically the first request signal 41 to the plurality of the terminals 20 via the first communication unit 101 (S10). For example, the first request signal 41 includes the operation code 401 of "Watch", the object unique identifier 403 of "*", the interface identifier 402 of "IID7", and the probability information indicating the response probability of "10%".

Only the terminal 20 including the interface having the interface identifier "IID7" receives the first request signal 41. In the terminal 20 which has received the first request signal 41, the first response unit 204 controls the second communication unit 201 at the response probability indicated by the probability information of the first request signal 41. Thus, the first response signal 51 is sent to the controller 10 at the response probability indicated by the probability information of the first request signal 41 (S20).

As to the first response signal 51, the operation code 501 is "Provide". The terminal identification information 502 denotes the address of the terminal 20 being the sender of the first response signal 51. The parameter 503 is the combination of the interface identifier "IID7" and the object unique identifier associated with the interface identifier "IID7".

For example, the terminal 21 transmits the first response signal 51 including the parameter 503 indicating the combination of the interface identifier "IID7" and the object unique identifier "OID1". The terminal 22 transmits the first response signal 51 including the parameter 503 indicating the combination of the interface identifier "IID7" and the object unique identifier "OID2".

It is supposed that the maximum number of the terminals 20 sending the first response signal 51 in response to receiving the first request signal 41 is 100 (that is, the number of the terminals including the interface having the interface identifier "IID7" is 100). The probability information of the first request signal 41 indicates the response probability of 10%. Theoretically, the ten terminals 20 send the first response signal 51.

In the controller 10, the counting unit 106 counts the first response signals 51 which the first communication unit 101 has received. The terminal number determination unit 107 determines the maximum number of the terminals 20 sending the first response signal 51 in response to receiving the first request signal 41 on the basis of the number of the first response signals 51 obtained from the counting unit 106 and the response probability. In other words, the terminal number determination unit 107 determines the maximum number of the terminals 20 including the interface having the interface identifier "IID7". When the ten terminals 20 send the first response signal 51, the first communication unit 101 receives the ten first response signals 51. The response probability is "10%". Thus, the terminal number determination unit 107 divides the number (=10) of the first response signals 51 received at the first communication unit 101 by the response probability (=10%) to obtain a quotient (=1), and multiplies the resultant quotient (=1) by 100 to obtain the total number of the terminals 20.

Upon receiving the request of sending the second request signal 42, the second request unit 111 requests the limited time determination unit 110 to determine the limited time period.

In response to the request from the second request unit 111, the limited time determination unit 110 determines the limited time period T10 on the basis of the total number of the terminals 20 stored in the terminal number storage unit 109 and provides the limited time period T10 to the second request unit 111. When the total number of the terminals 20 determined by the terminal number determination unit 107 is 100 and the maximum number of the first response signals 51 which the first communication unit 101 can receive per unit time is 10, the limited time period T10 is 10 [sec].

The second request unit 111 sends the second request signal 42 to the plurality of the terminals 20 via the first communication unit 101 (S30). The second request signal 42 includes the same operation code 401 (="Watch"), object unique identifier 403 (="*"), and interface identifier 402 (="IID7") as those of the first request signal 41. Further, the second request signal 42 includes the limited time information 406 indicative of the limited time period determined by the limited time determination unit 110.

Only the terminal 20 including the interface having the interface identifier "IID7" receives the second request signal 42. In the terminal 20 which has received the second request signal 42, the waiting time determination unit 205 determines the waiting time period on the basis of the limited time period T10 indicated by the limited time information of the second request signal 42. The second response unit 206 sends the second response signal 52 via the second communication unit 201 after a lapse of the waiting time period determined by the waiting time determination unit 205 (S40). As to the second response signal 52, the operation code 501 is "Provide". The terminal identification information denotes the address of the terminal 20 being the sender of the second response signal 52. The parameter 503 is the combination of the interface identifier "IID7" and the object unique identifier associated with the interface identifier "IID7".

As described in the above, the network system of the present embodiment includes the controller 10 and the plurality of the terminals 20 connected to the controller 10 via the network 30. The controller 10 includes the first communication unit 101 configured to communicate with the terminal 20 via the network 30, the first request unit 105, the counting unit 106, the terminal number determination unit 107, the limited time determination unit 110, and the second request unit 111. Each of the terminals 20 includes the second communication unit 201 configured to communicate with the controller 10 via the network 30, the first response unit 204, the waiting time determination unit 205, and the second response unit 206. The first request unit 105 is configured to send the first request signal 41 to the plurality of the terminals 20 via the first communication unit 101, the first request signal 41 including probability information indicative of the predetermined response probability. The first response unit 204 is configured to, upon receiving the first request signal 41 via the second communication unit 201, send the first response signal 51 to the controller 10 via the second communication unit 201 at the response probability indicated by the probability information included in the first request signal 41. The counting unit 106 is configured to count the first response signals 51 received via the first communication unit 101, and output the obtained number of the first response signals 51. The terminal number determination unit 107 is configured to determine the total number of the terminals 20 responding to the controller 10 on the basis of the response probability and the number of the first response signals 51 obtained from the counting unit 106. The limited time determination unit 110 is configured to determine the limited time period on the basis of the total number of the terminals 20 determined by the terminal number determination unit 107. The second request unit 111 is configured to send the second request signal 42 to the plurality of the terminals 20 via the first communication unit 101, the second request signal 42 including limited time information indicative of the limited time period determined by the limited time determination unit 110. The waiting time determination unit 205 is configured to, upon receiving the second request signal 42 via the second communication unit 201, select the waiting time period in a random manner from time periods not greater than the limited time period indicated by the limited time information included in the second request signal 42. The second response unit 206 is configured to send the second response signal 52 to the controller 10 via the second communication unit 201 after the waiting time period elapses.

In accordance with the network system of the present embodiment, each of the terminals 20 is responsive to the second request signal 42 multicast from the controller 10 for sending the second response signal 52 at a timing which is randomly determined at each of the terminals 20. Ideally, the timings determined respectively for the terminals 20 are distributed evenly within the limited time range provided by the limited time determination unit 110 (e.g., the range of 0 to 10 [sec]). Therefore, even when the network 30 employs the communication transport providing relatively low speed communication, it is possible to reduce the packet loss otherwise caused by collision between the second response signals 52. All of the second response signals 52 are sent before a lapse of the limited time period (e.g., 10 [sec]) determined in correspondence to the number of the terminals 20. Therefore, the limited time period can be prevented from becoming too short or long in relation to the number of the terminals 20. Thus, the network system of the present embodiment can prevents the collision between the response signals, yet improving communication efficiency.

In the network system of the present embodiment, the response probability is determined on the basis of the basis of the maximum number of the first response signals 51 which the first communication unit 101 can receive simultaneously, so as to allow the first communication unit 101 to receive the first response signals 51 respectively from all of the terminals 20 within the predetermined time period starting from the time of sending the first request signal 41.

Therefore, the controller 10 successfully receives the first response signals 51 respectively sent from the terminals 20 responding to the controller 10 without occurrence of the packet loss of the first response signal 51.

In the network system of the present embodiment, the terminal number determination unit 107 is configured to determine the total number of the terminals 20 on the basis of the quotient of the number of the first response signals 51 obtained from the counting unit 106 and the response probability of the probability information included in the first request signal 41.

Therefore, the total number of the terminals 20 can be calculated with high accuracy.

In the network system of the present embodiment, the limited time period is defined to be a predetermined range within which the first communication unit 101 receives a predetermined number of the second response signals 52. The predetermined number is defined to be the total number of the terminals 20 determined by the terminal number determination unit 107. The limited time determination unit is configured to calculate the quotient of the total number of the terminals 20 determined by the terminal number determination unit 107 and the number of the first response signals 51 which the first communication unit 101 can receive per unit time period and determine the limited time period on the basis of the resultant quotient.

Therefore, the limited time period can be set to a minimum time period within which the controller performs communication processes in the number identical to the total number of the terminals 20.

In the network system of the present embodiment, the controller 10 includes the terminal number storage unit 109 configured to store the total number of the terminals 20 determined by the terminal number determination unit 107. The limited time determination unit 110 is configured to determine the limited time period by use of the total number of the terminals 20 stored in the terminal number storage unit 109 once after the terminal number storage unit 109 stores the total number of the terminals 20. Therefore, the second request unit 111 generates the second request signal 42 including the limited time information indicative of the limited time period determined on the basis of the total number of the terminals 20 stored in the terminal number storage unit 109. The first communication unit 101 sends the second request signal 42 prepared in the aforementioned manner.

In other words, the controller 10 includes a storing means (terminal number storage unit 109) configured to store information (the total number of the terminals 20) derived from the number of the first response signals 51 which the first communication unit 101 has received. The controller 10 is configured to use the information stored in the storing means to create the second request signal 42 and send the created second request signal 42.

The controller 10 includes the terminal number storage unit 109 configured to store the total number of the terminals 20 responding to the first request signal 41, as the information derived from the number of the first response signals 51 which has been received by the first communication unit 101. Accordingly, once after the terminal number storage unit 109 has stored the total number of the terminals 20, there is no need for determining the total number of the terminals 20 responding to the first request signal 41, and the first request signal 41 need not be sent. Thus, it is unnecessary to send a set of the first and second request signals 41 and 42 every time for the purpose of obtaining the second response signal 52 from the terminal 20. Consequently, it is possible to reduce the communication traffic, and to shorten the transmission processing. Especially, the network system of the present embodiment is suitable for a network system which sees little change in the number of the terminals 20.

The first request signal 41 includes the specific identifier [OID+IID]. Therefore, only the terminal 20 having the object corresponding to the specific identifier sends the first response signal 51. Thus, the terminal number storage unit 109 stores the total number of the terminals 20, for each class of IID of the object (for each class defined by the specific identifier). For example, the terminal number storage unit 109 stores the total number "N1" regarding IID1, the total number "N2" regarding IID2, the total number "N3" regarding IID3, and the total number "N4" regarding IID4. The limited time determination unit 110 can determine the appropriate limited time T10 for each class defined by the specific identifier.

The controller 10 includes the terminal number update unit 108. The first request unit 105 is configured to send the first request signal 41 to the plurality of the terminals 20 periodically via the first communication unit 101. The terminal number update unit 108 is configured to, when the terminal number determination unit 107 determines the total number of the terminals 20, update the total number of the terminals 20 stored in the terminal number storage unit 109 in such a manner that the terminal number storage unit 109 stores the latest total number of the terminals 20 determined by the terminal number determination unit 107.

In other words, the controller 10 updates at regular intervals the total number of the terminals 20 stored in the terminal number storage unit 110. Therefore, the controller is enabled to adapt itself to the change in the configuration (the number of the terminals 20) of the network system. Moreover, the limited time period can be set to an appropriate time period depending on the number of the terminals 20.

Figure 7:
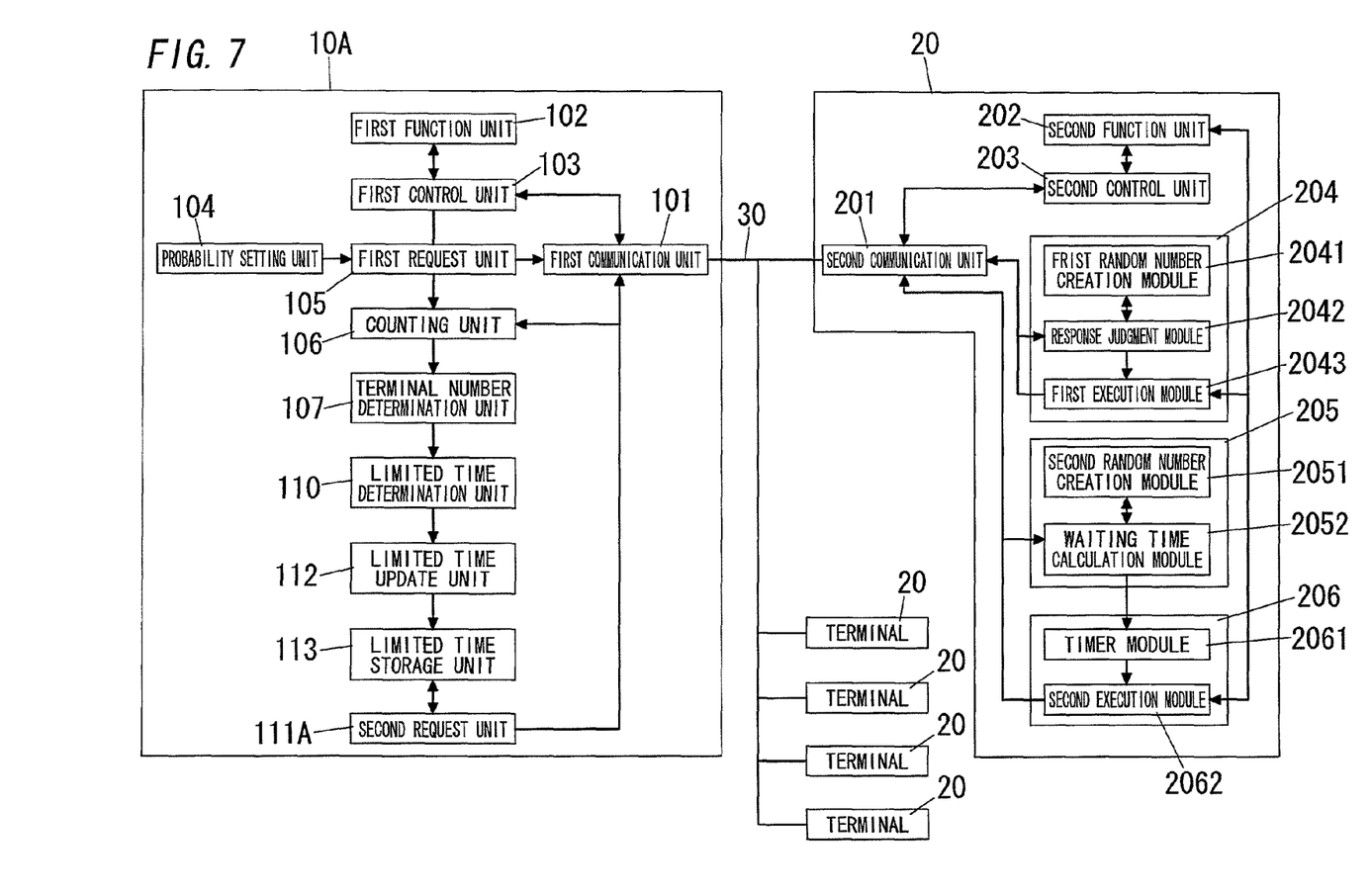
FIG. 7 is a diagram illustrating a configuration of a modification of the network system of the first embodiment.

FIG. 7 illustrates the network system according to a modification of the present embodiment. The network system of the modification includes the controller 10A and the plurality of terminals 20 connected to the controller 10A via the network 30. Components common to the network system of the modification and the network system of the present embodiment are designated by same reference numerals, and no explanations thereof are deemed necessary.

The controller 10A includes the first communication unit 101, the first function unit 102, and the first control unit 103. Further, the controller 10A includes the probability setting unit 104, the first request unit 105, the counting unit 106, the terminal number determination unit 107, the limited time determination unit 110, a limited time update unit 112, a limited time storage unit 113, and the second request unit 111A.

The limited time storage unit 113 is used for storing the limited time determined by the limited time determination unit 110.

Upon determination of the limited time period at the limited time determination unit 110, the limited time update unit 112 responds to store the limited time period in the limited time storage unit 113. Further, the limited time update unit 112 is configured to, when the limited time determination unit 110 newly determines the limited time period, update the limited time period in the limited time storage unit 113 in match with the newly determined limited time period.

Upon receiving the request of sending the second request signal 42, the second request unit 111A reads out the limited time period from the limited time storage unit 113. In other words, the second request unit 111A is configured to, once after the limited time storage unit 113 has stored the limited time period, transmit to the plurality of the terminals 20 via the first communication unit 101 the second request signal 42 including the limited time information 406 indicative of the limited time period stored in the limited time storage unit 113.

According to the network system of the present embodiment, the controller 10A includes the limited time storage unit 113 configured to store the limited time period determined by the limited time determination unit 110, as the information derived from the number of the first response signals 51 which the first communication unit 101 has received. The second request unit 111A creates the second request signal 42 which includes the limited time information indicative of the limited time period stored in the limited time storage unit 113 once after the limited time storage unit 113 has stored the limited time period. The first communication unit 101 sends the second request signal 42 prepared in the aforementioned manner.

As described in the above, according to the network system of the modification of the present embodiment, the controller 10A includes the storing means (limited time storage unit 113) configured to store the information (limited time period) derived from the number of the first response signals 51 which the first communication unit 101 has received. The controller 10A is configured to create the second request signal 42 on the basis of the information (limited time period) stored in the storing means (limited time storage unit 113) and send the second request signal 42 once after the storing means (limited time storage unit 113) has stored the information (limited time period).

Accordingly, once after the limited time storage unit 113 has stored the limited time period, there is no need for determining the limited time period, and the first request signal 41 need not be sent. Thus, it is unnecessary to send a set of the first and second request signals 41 and 42 every time for the purpose of obtaining the second response signal 52 from the terminal 20. Consequently, it is possible to reduce the communication traffic, and to shorten the transmission processing. Especially, the network system of the present embodiment is suitable for a network system which sees little change in the number of the terminals 20.

The first request signal 41 includes the specific identifier [OID+IID]. Therefore, only the terminal 20 having the object corresponding to the specific identifier sends the first response signal 51. Thus, the limited time storage unit 113 stores the limited time period, for each class of IID of the object (for each class defined by the specific identifier).

The controller 10A includes the limited time update unit 112. The first request unit 105 is configured to send the first request signal 41 to the plurality of the terminals 20 periodically via the first communication unit 101. The limited time update unit 112 is configured to, when the limited time determination unit 110 determines the limited time period, update the limited time period stored in the limited time storage unit 113 with the limited time period determined by the limited time determination unit 110.

In other words, the controller 10A updates at regular intervals the limited time period stored in the limited time storage unit 113. Therefore, the controller is enabled to adapt itself to the change in the configuration (the number of the terminals 20) of the network system. Moreover, the limited time period can be set to an appropriate time period depending on the number of the terminals 20.

Second Embodiment

Figure 8:
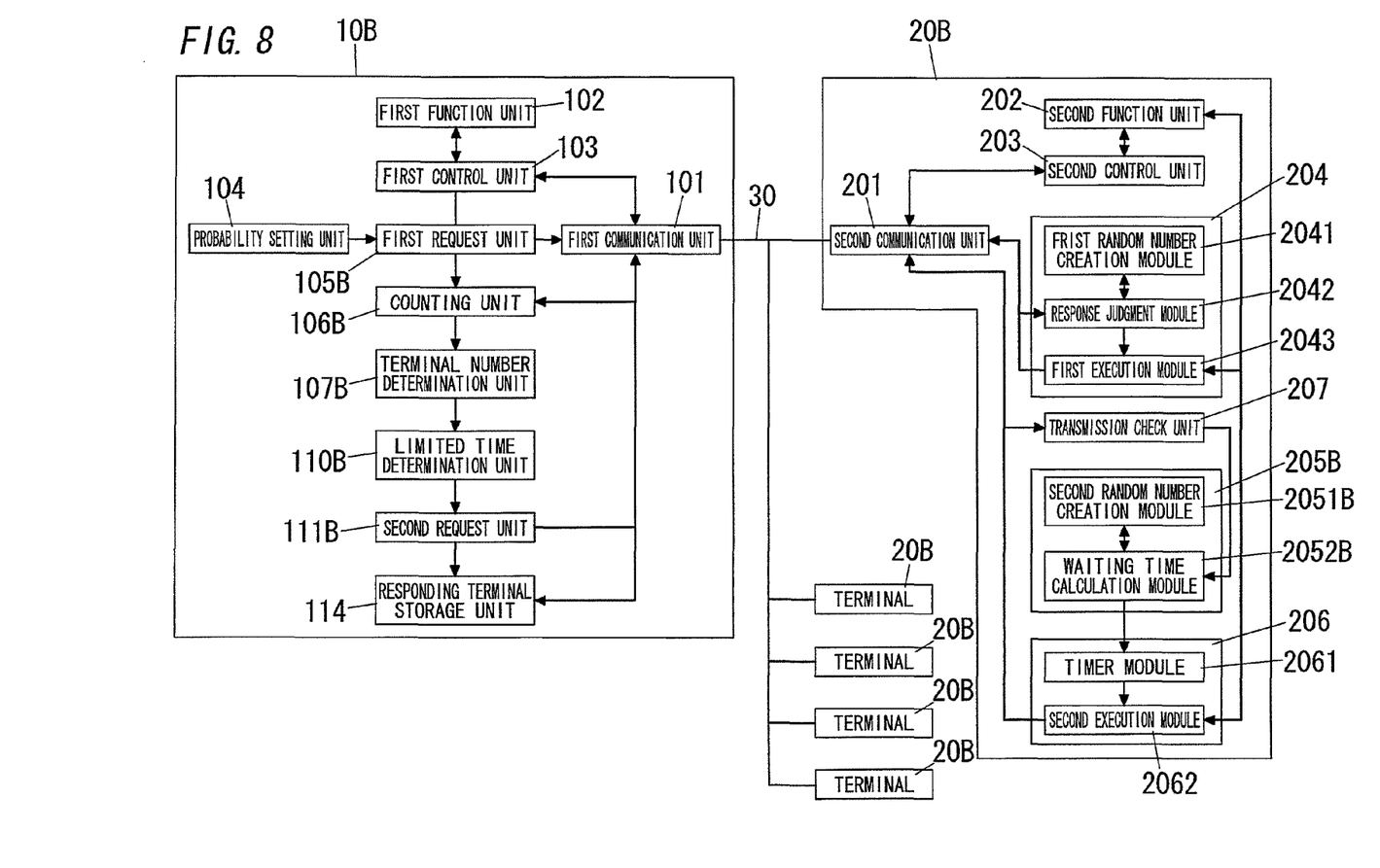
FIG. 8 is a diagram illustrating a configuration of the network system of the second embodiment.

FIG. 8 illustrates the network system of the present embodiment. The network system of the present embodiment includes the controller 10B and the plurality of terminals 20B connected to the controller 10B via the network 30. Components common to the network systems of the first and present embodiments are designated by same reference numerals, and no explanations thereof are deemed necessary.

The controller 10B includes the first communication unit 101, the first function unit 102, and the first control unit 103, the probability setting unit 104, the first request unit 105B, the counting unit 106B, the terminal number determination unit 107B, the limited time determination unit 110B, the second request unit 111B, and a responding terminal storage unit 114.

The terminal 20B includes the second communication unit 201, the second function unit 202, the second control unit 203, the first response unit 204, the waiting time determination unit 205B, the second response unit 206, and a transmission check unit 207.

The first request unit 105B is configured to, in response to receiving the request of sending the first request signal 41, send the first request signal 41 to the plurality of the terminals 20B via the first communication unit 101.

The counting unit 106B is configured to count the first response signals 51 received by the first communication unit 101 until a predetermined time period (reception time period) elapses from the time at which the first communication unit 101 has sent the first request signal 41. The counting unit 106B provides the counted number of the first response signals 51 to the terminal number determination unit 107B and the limited time determination unit 110B.

The terminal number determination unit 107B is configured to determine the maximum number (total number) of the terminals 20B responding to the controller 10B on the basis of the response probability indicated by the probability information 405 included in the first request signal 41 and the number of the first response signals 51 obtained from the counting unit 106B. The terminal number determination unit 107B provides the total number of the terminals 20B to the limited time determination unit 110B.

The limited time determination unit 110B determines the limited time period on the basis of the total number of the terminals 20B obtained from the terminal number determination unit 107B. The limited time determination unit 110B is configured to calculate a difference of the total number of the terminals 20B determined by the terminal number determination unit 107B and the number of the first response signals 51 counted by the counting unit 106B and calculate a quotient of the resultant difference and the number of the first response signals 51 which the first communication unit 101 can receive per unit time period and determine the limited time period on the basis of the resultant quotient.

In the present embodiment, the limited time period is determined as a maximum time period within which all the terminals 20B in the number identical to a difference between the total number of the terminals 20B estimated by the terminal number determination unit 107B and the number of the first response signals 51 counted by the counting unit 106B send the second response signal 52 to the controller 10B.

Accordingly, in the present embodiment, the above predetermined number is the number of the terminals 20B which have not sent the first response signal 51. For example, when the number of the first response signals 51 counted by the counting unit 106B is 10, and when the total number of the terminals 20B determined by the terminal number determination unit 107B is 100, and when the maximum number of the first response signals 51 which the first communication unit 101 can receive per unit time is 10, the limited time period is 9 [sec].

The limited time determination unit 110B provides the determined limited time period to the second request unit 111B.

The responding terminal storage unit 114 is configured to store the terminal identification information 502 of the first response signal 51 received by the first communication unit 101. The responding terminal storage unit 114 is configured to store the terminal identification information 502 of the first response signal 51 received by the first communication unit 101 within the predetermined time (reception time) from the time at which the first communication unit 101 has sent the first request signal 41. In other words, the responding terminal storage unit 14 creates a list of the terminals 20B which has responded to the first request signal 41.

The second request unit 111B is configured to send the second request signal 42B (see FIG. 9) to the plurality of the terminals 20B via the first communication unit 101 in response to receiving the limited time period from the limited time determination unit 110.

Figure 9:
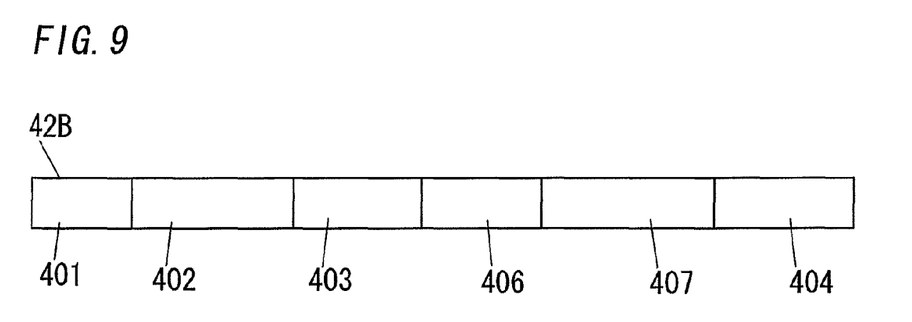
FIG. 9 is a diagram illustrating a configuration of the second request signal of the network system in accordance with the second embodiment.

The second request signal 42B includes a responding terminal list in addition to the operation code 401, the interface identifier 402, the object unique identifier 403, and the limited time information 406. The responding terminal list is defined as a list of the terminal identification information 502 which has stored in the responding terminal storage unit 114, that is, the terminal identification information 502 of the terminal 20B which has sent the first response signal 51.

In brief, the controller 10B sends the second request signal 42B including the responding terminal list 407 to the terminals 20B in order to announce to the terminals 20B which terminal 20B has responded to the controller 10B.

The transmission check unit 207 is configured to, upon receiving the second request signal 42B via the second communication unit 201, check whether or not the responding terminal list 407 of the second request signal 42B contains the address information which is identical to the address information (terminal identification information) stored in the second communication unit 201. Upon acknowledging that the responding terminal list 407 of the second request signal 42B contains no address information identical to the address information stored in the second communication unit 201, the transmission check unit 207 requests the waiting time calculation module 2052B to calculate the waiting time period. When acknowledging that the responding terminal list 407 of the second request signal 42B contains the address information identical to the address information stored in the second communication unit 201, the transmission check unit 207 does not request the waiting time calculation module 2052B to calculate the waiting time period.

The waiting time calculation module 2052B requests the second random number creation module 2051 to create the random number, upon being requested to calculate the waiting time period by the transmission check unit 207. Upon receiving the random number from the second random number creation module 2051, the waiting time calculation module 2052B calculates the waiting time period.

As described in the above, when the terminal 20B acknowledges that its address information is not included in the terminal list 407 (when the terminal 20B has not sent the first response signal 51 to the controller 10B), the terminal 20B calculates the waiting time period. As a result, the terminal 20B sends the second request signal 52 to the controller 10B. In brief, upon receiving the second request signal 42B, the terminal 20B checks whether or not it has sent the first request signal 51 to the controller 10B. When the terminal 20B acknowledges that the terminal 20B has sent the first response signal 51 to the controller 10B, the terminal 20B does not send the second response signal 52. Upon acknowledging that the terminal 20B has not sent the first response signal 51 to the controller 10B, the terminal 20B sends the second response signal 52.

Next, an explanation is made to operation of the network system of the present embodiment.

In the controller 10B, upon receiving the request of sending the first request signal 41, the first request unit 105B controls the first communication unit 101 in a manner to send the first request signal 41 to the plurality of the terminals 20B. For example, the first request signal 41 includes the operation code 401 of "Watch", the object unique identifier 403 of "*", the interface identifier 402 of "IID7", and the probability information indicating the response probability of "10%".

Only the terminal 20B including the interface having the interface identifier "IID7" receives the first request signal 41. In the terminal 20B which has received the first request signal 41, the first response unit 204 controls the second communication unit 201 at the response probability indicated by the probability information 405 of the first request signal 41. In other words, the first response signal 51 is sent to the controller 10B at the response probability indicated by the probability information 405 of the first request signal 41.

As to the first response signal 51, the operation code 501 is "Provide". The terminal identification information 502 denotes the address of the terminal 20B being the sender of the first response signal 51. The parameter 503 is the combination of the interface identifier "IID7" and the object unique identifier associated with the interface identifier "IID7".

In the controller 10B, the counting unit 106B counts the first response signals 51 which the first communication unit 101 has received. The terminal number determination unit 107B determines the total number of the terminals 20B having not responded to the first request signal 41 on the basis of the number of the first response signals 51 obtained from the counting unit 106B and the response probability. When the ten terminals 20B send the first response signal 51, the first communication unit 101 receives the ten first response signals 51. The response probability is "10%". Thus, the terminal number determination unit 107B divides the number (=10) of the first response signals 51 received at the first communication unit 101 by the response probability (=10%) to obtain a quotient (=1). The terminal number determination unit 107B calculates a difference (=90) between the number of the terminals 20B derived from the quotient (=1) and the number (=10) of the first response signals 51 received by the first communication unit 101. The terminal number determination unit 107B provides the difference (=90) as the total number of the terminals 20B.

The limited time determination unit 110B determines the limited time period T10 on the basis of the total number of the terminals 20B provided from the terminal number determination unit 107B and notifies the second request unit 111B of the limited time period T10. When the total number of the terminals 20B determined by the terminal number determination unit 107B is 90 and the maximum number of the first response signals 51 which the first communication unit 101 can receive per unit time is 10, the limited time period T10 is 9 [sec]. As apparent from the above, the limited time period T10 is shortened depending on an increase in the number of the terminals 20B which has responded to the first request signal 41.

The responding terminal storage unit 114 stores the terminal identification information 502 of the first response signal 51 which has been received by the first communication unit 101.

Upon receiving the limited time period from the limited time determination unit 110B, the second request unit 111B controls the first communication unit 101 in a manner to send the second request signal 42B to the plurality of the terminals 20B. The second request signal 42B includes the same operation code 401 (="Watch"), object unique identifier 403 (="*"), and interface identifier 402 (="IID7") as those of the first request signal 41. Further, the second request signal 42B includes the limited time information 406 and the responding terminal list 407. The limited time information 406 indicates the limited time period determined by the limited time determination unit 110B, and the responding terminal list 407 indicates the terminal identification information stored in the responding terminal storage unit 114.

Only the terminal 20B including the interface designated by the interface identifier "IID7" receives the second request signal 42B. In the terminal 20B which has received the second request signal 42B, the transmission check unit 207 checks whether or not the responding terminal list 407 of the second request signal 42B includes the terminal identification information which is identical to the terminal identification information stored in the second communication unit 201. Upon acknowledging that the responding terminal list 407 of the second request signal 42B contains no address information identical to the address information stored in the second communication unit 201, the transmission check unit 207 requests the waiting time calculation module 2052B to calculate the waiting time period. Consequently, the waiting time determination unit 205B determines the waiting time period on the basis of the limited time period T10 indicated by the limited time information of the second request signal 42B.

In this instance, the second response unit 206 controls the second communication unit 201 after a lapse of the waiting time period determined by the waiting time determination unit 205, thereby sending the second response signal 52 to the controller 10B. As to the second response signal 52, the operation code 501 is "Provide". The terminal identification information 502 denotes the address of the terminal 20B being the sender of the second response signal 52. The parameter 503 is the combination of the interface identifier "IID7" and the object unique identifier associated with the interface identifier "IID7".

In contrast, when acknowledging that the responding terminal list 407 of the second request signal 42B contains the address information identical to the address information stored in the second communication unit 201, the transmission check unit 207 does not request the waiting time calculation module 2052B to calculate the waiting time period. Consequently, the waiting time determination unit 205B does not determine the waiting time period. In this instance, the terminal 20B sends no second response signal 52 to the controller 10B.

According to the aforementioned network system of the present embodiment, the limited time period is defined to be a predetermined range within which the first communication unit 101 receives the predetermined number of the second response signals 52. The predetermined number is defined to be the number of the terminals 20B which have not sent the first response signal 51. The limited time determination unit 110B is configured to divide a difference by the number of the first response signals 51 which the first communication unit 101 can receive per unit time period to obtain the limited time period. The difference is defined as a difference between the total number of the terminals 20B determined by the terminal number determination unit 107B and the number of the first response signals 51 counted by the counting unit 106B. Each of the terminals 20B is configured to send no second response signal 52 once after sending the first response signal 51 to the controller 10B.

According to the network system of the present embodiment, the terminal 20B once responded to the first response signal 41 will not respond to the second request signal 42B. Therefore, the terminal 20B responds only to either one of the first and second request signals 41 and 42B. Thus, the limited time period can be shortened in contrast to an instance where each of the terminals 20B sends the second response signal 52 irrespective of whether or not it has responded to the first request signal 41. Consequently, the communication efficiency can be improved.

Besides, the network system of the first or second embodiments may include a plurality of the controllers 10, 10A, or 10B. Further, the controller 10, 10A, or 10B may broadcast the request signal.

The invention claimed is:

1. A network system comprising:
   a controller including a processor and memory; and
   a plurality of terminals connected to said controller via a network, each terminal including a processor and memory,
   wherein
   said controller comprises a first communication unit configured to communicate with said terminal via the network, a first request unit, a counting unit, a terminal number determination unit, a limited time determination unit, and a second request unit,
   each of said terminals comprising a second communication unit configured to communicate with said controller via the network, a first response unit, a waiting time determination unit, and a second response unit,
   said first request unit of the controller configured to send a first request signal to the plurality of said terminals via said first communication unit, the first request signal including probability information indicative of a predetermined probability,
   said first response unit of each terminal configured to, upon receiving the first request signal via said second communication unit, send a first response signal to said controller via said second communication unit at the probability indicated by the probability information included in the first request signal,
   said counting unit of the controller configured to count the first response signals received via said first communication unit, and output the obtained number of the first response signals,
   said terminal number determination unit of the controller configured to determine a total number of said terminals responding to said controller on the basis of the probability and the number of the first response signals obtained from said counting unit,
   said limited time determination unit of the controller configured to determine a limited time period on the basis of the total number of said terminals determined by said terminal number determination unit of the controller,
   said second request unit of the controller configured to send a second request signal to the plurality of said terminals via said first communication unit, the second request signal including limited time information indicative of the limited time period determined by said limited time determination unit,
   said waiting time determination unit of each terminal configured to, upon receiving the second request signal via said second communication unit, select a waiting time period in a random manner from time periods not greater than the limited time period indicated by the limited time information included in the second request signal, and
   said second response unit of each terminal configured to send a second response signal to said controller via said second communication unit after a lapse of the waiting time period.

2. The network system as set forth in claim 1, wherein the probability indicated by the probability information is determined on the basis of a maximum number of the first response signals which the first communication unit can receive simultaneously, so as to allow said first communication unit to receive the first response signals respectively from all of said terminals within a predetermined time period starting from the time of sending the first request signal.

3. The network system as set forth in claim 1, wherein said terminal number determination unit is configured to determine the total number of said terminals on the basis of a quotient of the number of the first response signals obtained from said counting unit and the probability of the probability information included in the first request signal.

4. The network system as set forth in claim 1, wherein the limited time period is defined to be a predetermined range within which said first communication unit receives a predetermined number of the second response signals, the predetermined number defined to be the total number of said terminals determined by said terminal number determination unit, and
said limited time determination unit configured to calculate a quotient of the total number of said terminals determined by said terminal number determination unit and the number of the first response signals which said first communication unit can receive per unit time period and determine the limited time period on the basis of the resultant quotient.

5. The network system as set forth in claim 1, wherein the limited time period is defined to be a predetermined range within which said first communication unit receives a predetermined number of the second response signals, the predetermined number defined to be the number of said terminals which have not sent the first response signal,
said limited time determination unit configured to divide a difference by the number of the first response signals which said first communication unit can receive per unit time period to determine the limited time period, the difference defined as a difference between the total number of said terminals determined by said terminal number determination unit and the number of the first response signals counted by said counting unit, and
each of said terminals configured to send no second response signal once after sending the first response signal to said controller.

6. The network system as set forth in claim 1, wherein the memory is configured to store information derived from the number of the first response signals,
said controller configured to use the information stored in said memory to create the second request signal and send the created second request signal.

7. The network system as set forth in claim 6, wherein
said memory storing the total number of said terminals determined by said terminal number determination unit as the information derived from the number of the first response signals,
said limited time determination unit configured to determine the limited time period by use of the total number of said terminals stored in said terminal number storage unit.

8. The network system as set forth in claim 7, wherein
said controller further comprises a terminal number update unit, said first request unit configured to send the first request signal to the plurality of said terminals periodically via said first communication unit, and
said terminal number update unit configured to, upon acknowledging that said terminal number determination unit newly determines the total number of said terminals, update the total number of said terminals stored in said terminal number storage unit in match with the total number of said terminals newly determined by said terminal number determination unit.

9. The network system as set forth in claim 6, wherein
said memory storing the limited time period determined by said limited time determination unit as the information derived from the number of the first response signals,
said second request unit configured to create the second request signal which includes the limited time information indicative of the limited time period stored in said limited time storage unit.

10. The network system as set forth in claim 9, wherein
said controller further comprises a limited time update unit, said first request unit configured to send the first request signal to the plurality of said terminals periodically via said first communication unit, and
said limited time update unit configured to, upon acknowledging that said limited time determination unit newly determines the limited time period, update the limited time period stored in said limited time storage unit in match with the limited time period newly determined by said limited time determination unit.

* * * * *